(12) United States Patent
Diamond et al.

(10) Patent No.: US 8,044,966 B1
(45) Date of Patent: Oct. 25, 2011

(54) METHOD AND APPARATUS FOR DISPLAY IMAGE ADJUSTMENT

(75) Inventors: Michael B. Diamond, Los Gatos, CA (US); Abraham B. de Waal, San Jose, CA (US); David R. Morey, Chapel Hill, NC (US); Jerome F. Duluk, Jr., Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 12/649,213

(22) Filed: Dec. 29, 2009

Related U.S. Application Data

(62) Division of application No. 11/951,289, filed on Dec. 5, 2007, which is a division of application No. 10/884,610, filed on Jul. 2, 2004, now Pat. No. 7,623,135, which is a division of application No. 10/185,764, filed on Jun. 27, 2002, now Pat. No. 6,963,348.

(60) Provisional application No. 60/384,663, filed on May 31, 2002.

(51) Int. Cl.
*G06T 15/00* (2006.01)

(52) U.S. Cl. ........ 345/582; 345/426; 345/581; 345/660; 345/697; 345/698; 382/275; 353/69; 353/70

(58) Field of Classification Search .................. 345/418, 345/426, 581, 582, 660, 698, 697; 382/275; 353/69, 70
See application file for complete search history.

(56) References Cited

U.S. PATENT DOCUMENTS

| | | | |
|---|---|---|---|
| 4,974,073 A | 11/1990 | Inova | |
| 5,136,390 A | 8/1992 | Inova et al. | |
| 6,191,827 B1 | 2/2001 | Segman et al. | |
| 6,305,805 B1 | 10/2001 | Liebenow | |
| 6,361,171 B1 | 3/2002 | Ejiri et al. | |
| 6,609,797 B2 * | 8/2003 | Ejiri et al. | 353/69 |
| 6,618,076 B1 | 9/2003 | Sukthankar et al. | |
| 6,802,614 B2 * | 10/2004 | Haldiman | 353/69 |
| 6,911,980 B1 | 6/2005 | Newell et al. | |
| 6,940,529 B2 | 9/2005 | Deering | |
| 6,963,348 B2 | 11/2005 | Diamond et al. | |

(Continued)

OTHER PUBLICATIONS

Holmes, Richard E.; "Large Screen Color CRT Projection System with Digital Correction", SPIE vol. 760 Large Screen Projection Displays (1987).

Green, et al.; "A New Computer-Human Interface for Aligning and Edge-Matching Multichannel Projector Systems", SID 88 Digest May 1988.

(Continued)

*Primary Examiner* — Phu Nguyen
(74) *Attorney, Agent, or Firm* — Patterson & Sheridan, LLP

(57) ABSTRACT

Method and apparatus for display image adjustment is described. More particularly, handles associated with polygon vertices of a polygon rendered image are provided as a graphical user interface (GUI). These handles may be selected and moved by a user with a cursor pointing device to adjust a displayed image for keystoning, among other types of distortion. This GUI allows a user to adjust a projected image for position of a projector with respect to imaging surface, as well as for imaging surface contour, where such contour may be at least substantially planar, cylindrical, or spherical and where such contour may comprise multiple imaging surfaces. This advantageously may be done without special optics or special equipment. An original image is used as texture for rendering polygons, where the image is applied to the rendered polygons.

16 Claims, 13 Drawing Sheets

U.S. PATENT DOCUMENTS

| | | | |
|---|---|---|---|
| 6,982,730 B2 | 1/2006 | Han | |
| 7,079,157 B2 | 7/2006 | Deering | |
| 7,196,707 B2* | 3/2007 | Davignon | 345/442 |
| 7,380,946 B1 | 6/2008 | Teng et al. | |
| 7,385,612 B1* | 6/2008 | Peterson | 345/619 |
| 7,441,906 B1 | 10/2008 | Wang et al. | |
| 7,474,799 B2* | 1/2009 | Bassi et al. | 382/275 |
| 7,483,031 B2 | 1/2009 | Williams et al. | |
| 7,581,839 B1 | 9/2009 | Wang et al. | |
| 7,586,492 B2 | 9/2009 | Riach et al. | |
| 7,609,228 B1 | 10/2009 | Teng | |
| 7,623,135 B1 | 11/2009 | Diamond et al. | |
| 7,771,055 B2* | 8/2010 | Matsumoto et al. | 353/69 |
| 7,808,513 B1* | 10/2010 | Teng | 345/647 |
| 7,850,312 B2* | 12/2010 | Wang et al. | 353/70 |
| 2004/0137935 A1 | 7/2004 | Zarom | |

OTHER PUBLICATIONS

Lyon, Paul.; "Edge-Blending Multiple Projection Displays on a Dome Surface to Form Continuous Wide Angle Fields-of-View", Interservice/Industry Training Equipment Conference; Proceedings; Nov. 1985.

Sukthankar, Rahul.; "Smart Projectors:Camera-Projector Systems", http://www.cs.cmu.edu/~rahuls/Research/Projector. May 21, 2002 pp. 1-3.

Microsoft Word 2000, Copyright 1983-1999.

* cited by examiner

METHOD AND APPARATUS FOR DISPLAY IMAGE ADJUSTMENT

CROSS-REFERENCE TO RELATED APPLICATIONS

This application is a divisional of U.S. patent application Ser. No. 11/951,289, filed Dec. 5, 2007, which is a divisional of U.S. patent application Ser. No. 10/884,610, filed Jul. 2, 2004, issued as U.S. Pat. No. 7,623,135 on Nov. 24, 2009, which is a divisional of U.S. patent application Ser. No. 10/185,764, filed Jun. 27, 2002, issued as U.S. Pat. No. 6,963,348 on Nov. 8, 2005, which relates to and claims benefit of U.S. Provisional Patent Application Ser. No. 60/384,663, filed May 31, 2002. The subject matter of these related applications is hereby incorporated herein by reference.

FIELD OF THE INVENTION

The present invention relates generally to method and apparatus for display image adjustment, and more particularly to method and apparatus for screen display or projected image adjustment to adjust for geometric distortion.

BACKGROUND OF THE INVENTION

Anyone who has ever viewed an image on a television set, a computer monitor, a projection screen or other projection surface, and the like, where one corner of the image was out of alignment has experienced a form distortion, namely, a geometric distortion called "keystoning" or "keystone" geometric distortion. Keystoning is where an image is out of alignment, conventionally at one or more of the corners, of the image producing a trapezoidal or trapezoidal-like shape.

Computer monitors and televisions sets conventionally come with mechanisms for manually adjusting a display screen image, not only at the corners but also top and bottom side adjustments and left and right side adjustments. However, these adjustments conventionally require using multiple adjustment modes, where an adjustment in one mode may affect another adjustment in another mode. This leads to a time consuming iterative approach to bring a display image into alignment.

Iterative adjustment for image projectors conventionally involves moving the projector itself. Thus, a projector often occupies a central point in a room, where leg adjustment screws are used to adjust to a support surface on which the projector is located. The projector lens is thus aligned to be at least substantially parallel with a projection surface. Adjusting position of a projector conventionally is an iterative approach where one adjustment affects another. An additional annoyance is having a projector in the way of a presenter and attendees, as the projector conventionally is centered to the projected image to minimize distortion. If a projector is not on-axis with respect to a projection surface (i.e., the direction of the projection is not perpendicular to the screen), keystoning may result.

Modern digital projectors have keystone correction allowing for "squaring up" a projected image when projecting off-axis. However, most of these corrections are optical adjustments and not image adjustments. Accordingly, off-axis angle is limited owing to manufacturing cost of more exotic lenses. Still others have suggested warping of an image to compensate for keystoning. However, such approaches conventionally involve addition of a camera to sense a displayed image or require data input to determine position of a displayed image. Moreover, such systems involve special circuitry and/or complex software to warp an image to correct for keystoning.

Furthermore, projecting an image off-axis to a screen or imaging surface can have effects other than keystoning, such as anisotropic or aspect ratio geometric distortion. An example of anisotropic geometric distortion is text that progressively expands vertically, namely, an unequal image display above and below a horizontal optical axis. Anisotropic distortion limits use of off-axis projection, even though it may be desirable to position a projector off-axis in order to have more distance from a projection surface to project a larger image.

Accordingly, it would be desirable and useful to provide method and apparatus for display image adjustment that is more intuitive for a user and costs less than optical adjustment or prior image warp techniques. Additionally, it would be desirable and useful if such method and apparatus enhanced ability for off-axis projection.

SUMMARY

The present invention provides method and apparatus for adjusting an image, in particular a projected image. The image can be the desktop display of a computer, including that of various Microsoft Windows operating systems. Because it is not always feasible or desirable to have a projector perpendicular and centered to a screen, a graphic user interface (GUI) is provided to facilitate adjustment of the projected image when the projector is off-axis or not centered with respect to the screen. In essence, the GUI enables a user to move one or more corners or sides of the projected image in order to convert a pincushioned or trapezoidal projected image into a rectilinear projected image. Such adjustment by a user may be done in less than a minute. Additionally, an embodiment of the GUI enables the user to move the center of the projected image to adjust for anisotropy. An aspect of the present invention is a GUI for reducing distortion in a projected image. The GUI comprises handles projected with the projected image, where the handles are associated with vertices of the projected image and are selectable and moveable by a user for adjusting the projected image.

Another aspect of the present invention is a method for reducing distortion in a displayed image. Image content is obtained and stored as a texture having a set of texels. The image content is applied as a texture to at least one polygon having vertices associated with texture coordinates in the texture. The projected image is created by rendering the polygons with the image applied as a texture. The rendering can be done with a three-dimensional (3D) graphics pipeline. In the GUI at least one handle related to a vertex of the vertices is displayed with the displayed image and moved to adjust the displayed image. Location of the at least one handle is updated in response to movement of the at least one handle. The vertex is changed in response to the location of the at least one handle update, texture coordinates of the set of texture coordinates are changed in response to the vertex change; and the displayed image is changed in response to change of the texture coordinates of the set of texture coordinates for adjustment of the displayed image.

Another aspect of the present invention is a method of correcting a distortion in a displayed image. Image content is obtained and stored as a texture. Polygons for the image content are rendered, where each polygon of the polygons has vertices at least some of which are associated with texture coordinates within the texture. Handles for the displayed image associated with the image content and with the at least some of the vertices are displayed. Locations of the handles affecting the at least some of the vertices associated with the handles are received, as the handles are moveable to change the displayed image.

Another aspect of the present invention is a method for counteracting distortion of a displayed image. Image content is obtained. Pixel values for the image content are written to an off-screen medium. Polygons using the image content written to the off-screen medium are rendered as a texture, and moveable vertices associated with the polygons are provided, where the vertices are associated with texture coordinates within the texture and are moveable for counteracting distortion of the displayed image.

Another aspect of the present invention is a GUI for reducing distortion in a displayed image. Objects are displayed with the displayed image. The objects are associated with vertices of the displayed image and are selectable and moveable by a user for adjusting the displayed image.

Another aspect of the present invention is a method for associating positions. Image content is provided and displayed as a screen display image. The image content is graphically processed by mapping the image content with polygons having vertices, projecting the image content after graphical processing as a projected display image, selecting a projected position of the projected display image, associating the projected position with a polygon of the polygons, and locating a screen position relative to the polygon and the projected position.

Another aspect of the present invention is a method for determining associated cursor positions between user interfaces. A first user interface and a second user interface are provided. The second user interface is a graphically processed version of the first user interface. Map coordinates are associated with first positions in the first user interface, and vertex locations are associated with second positions in the second user interface. A first cursor position in the second user interface is obtained from the second positions, and the map coordinates are processed using the vertex locations and the cursor position to determine from the first positions a second cursor position in the first user interface.

Another aspect of the present invention is a method for determining associated cursor positions between user interfaces. A screen display user interface is provided and graphically processed to provide a projected user interface with vertex locations. Map coordinates are associated with screen display positions. A projected cursor position of the projected user interface is obtained from the vertex locations, and the map coordinates are processed using the vertex locations and the projected cursor position to determine from the map coordinates a screen display cursor position of the screen display user interface.

Another aspect of the present invention is a method for determining a first cursor position. Map coordinates are associated with positions in a first user interface. Vertex locations are associated with positions in a second user interface, where the second user interface is a graphically processed version of the first user interface. A second cursor position within the second user interface is received, and the map coordinates are interpolated using the vertex locations and the second cursor position to determine the first cursor position.

Another aspect of the present invention is a portable device configured for displaying a graphic user interface for adjusting an image. Memory is configured for storing the image as a texture and for storing a program product. The program product is configured to provide vertices for the image and to provided handles for projection with the image and associated with the vertices. The handles are moveable for adjusting the image.

Another aspect of the present invention is a portable device configured with a method for displaying a graphic user interface. The graphic user interface is provided to a first display and stored as a texture. Polygons are rendered, where each polygon comprises vertices at least some of which are associated with texture coordinates within the texture. Handles are rendered at least some of which are associated with some of the vertices. The rendered polygons and rendered handles are sent to a second display device. Locations of the handles are received, where the received locations affect the associated vertices thereby changing the rendered polygons.

Another aspect of the present invention is a method of providing a common cursor on different displays. Screen image coordinates for a first cursor are obtained. A polygon is mapped to a screen image in which the first cursor is located. Texture coordinates for a second cursor are determined in response to the polygon and the screen image coordinates.

Another aspect of the present invention is a method for adjusting for anisotropic distortion. An unadjusted image is rendered with polygons. Vertices of the polygons associated with corners of the unadjusted image are selected, and at least one vertex of the vertices selected is moved to provide an adjusted image. A center of the adjusted image is calculated in response to the vertices for the adjusted image. The adjusted image is adjusted for anisotropic distortion in response to the center calculated.

Another aspect of the present invention is a method for adjusting for anisotropic distortion. An image is rendered with polygons. A handle centered to the image is rendered, where the handle moveable by a user for adjusting the image for anisotropic distortion in response to movement thereof.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1A:
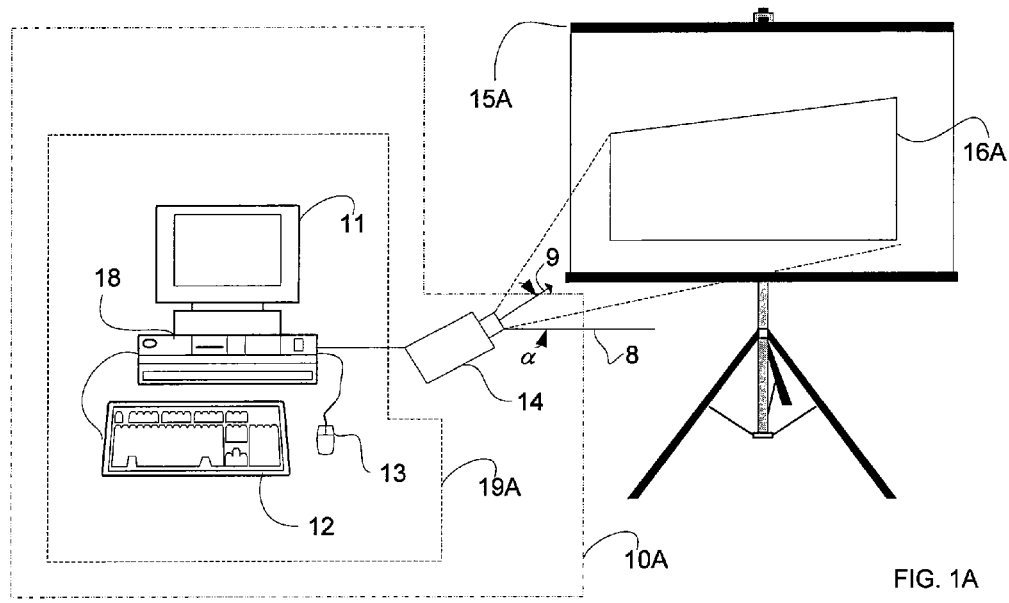
FIGS. 1A through 1C are pictorial views of exemplary embodiments of image projection systems in accordance with one or more aspects of the present invention.

FIG. 1A is a pictorial view of an exemplary embodiment of an image projection system 10A in accordance with one or more aspects of the present invention. Image projection system 10A comprises computer system 19A and projector 14. Computer system 19A comprises computer monitor 11, mouse 13, keyboard 12 and computer 18. Computer 18 comprises an image adjustment program, described below in more detail. An image stored in computer 18, or obtained from a network when computer 18 is coupled to such a network, is provided as output to projector 14. Projector 14 projects such an image onto projection screen 15A for viewing projected image 16A. Projector 14 may be a CRT, LCD or DLP type of projector. Moreover, if projector 14 comprises computing capability described below in more detail, projector 14 may comprise such an image adjustment program.

Notably, projected image 16A is exhibiting keystoning. Adjustment to remove or reduce this distortion is described below in more detail. Projector 14 is shown off-axis with respect to a plane of screen 15A, and at an angle, α, with respect to direction of projection 9 and a ground or horizontal plane 8. However, for purposes of clarity, angle, α, is shown as an angle between horizontal plane 8 and a bottom ray of projection hereinafter.

Figure 1B:
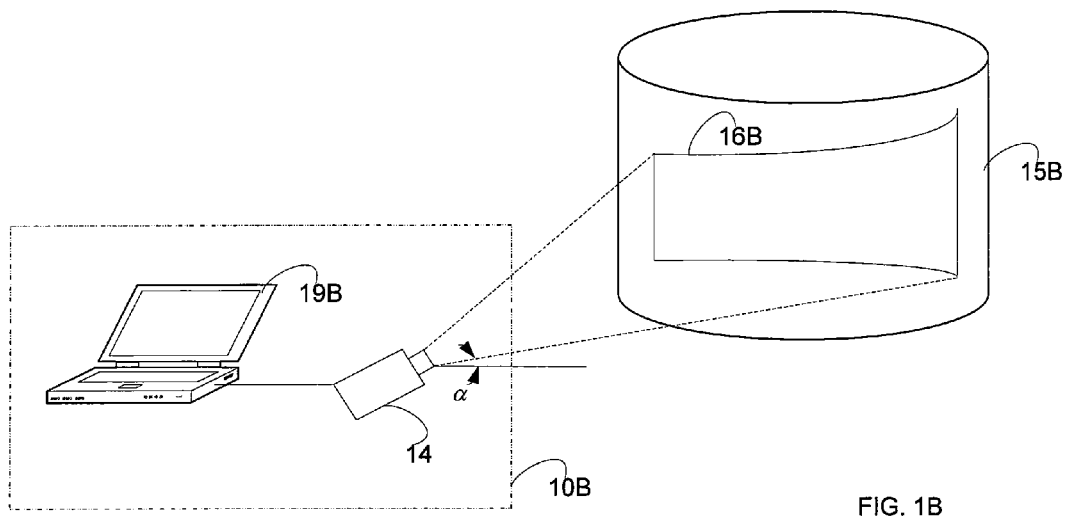
Figure 1C:
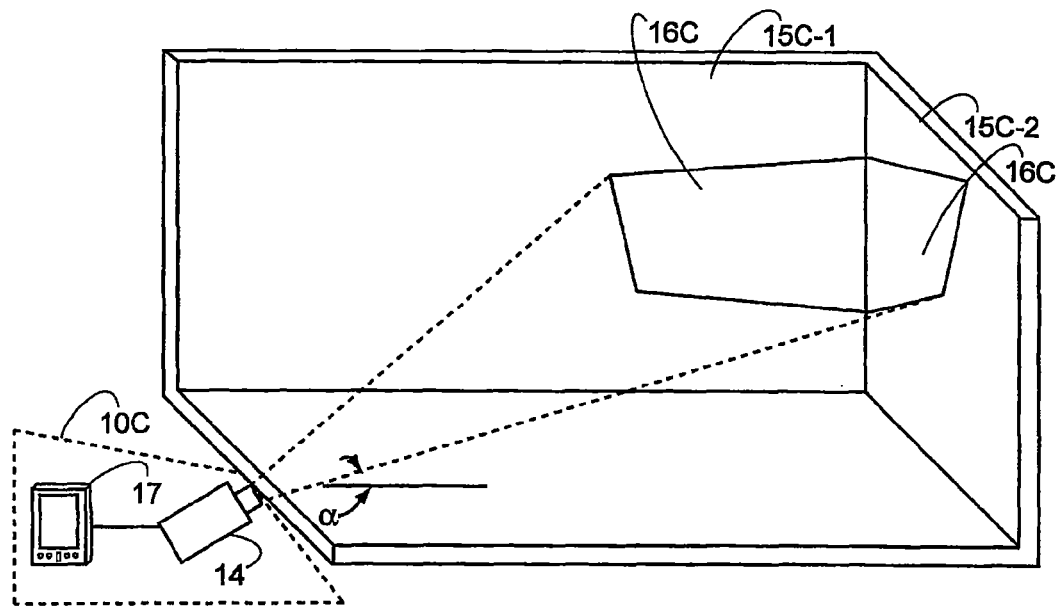
Figure 1D:
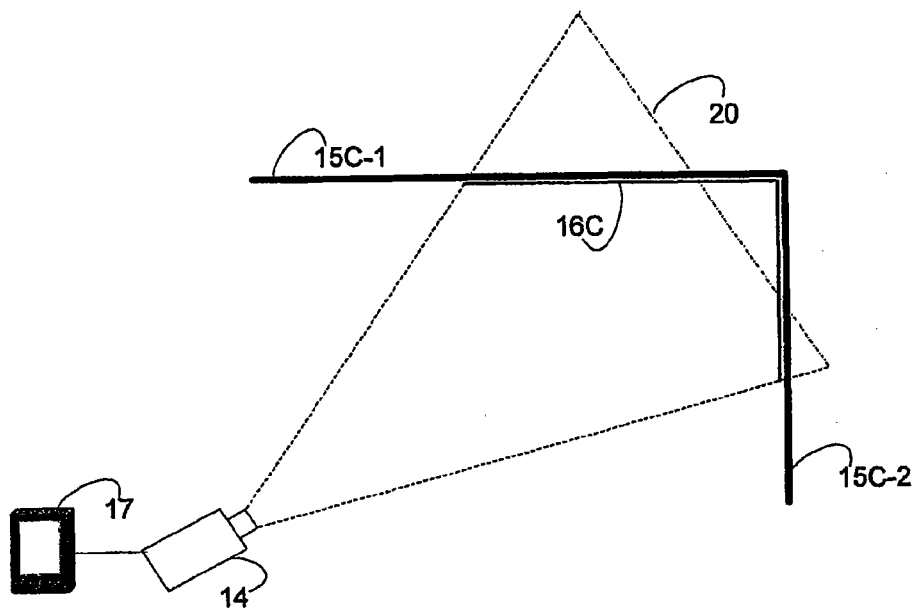
FIG. 1D is the pictorial view of FIG. 1C for a system portion and a top-down view of FIG. 10 for a projection portion.

FIG. 1B is a pictorial view of an exemplary embodiment of an image projection system 10B in accordance with one or more aspects of the present invention. Projection system 10B comprises notebook computer 19B and projector 14. Accordingly, computer system 19A of FIG. 1A is replaced with notebook computer 19B. Computer 19B comprises an image adjustment program, described below in more detail. Image surfacing need not be at least substantially planar as is projection screen 15A of FIG. 1A, but may be a cylindrical surface as is image surface 15B. Contour of an image surface, as well as angle, α, of projector 14 with respect to such an image surface, will have an affect on amount of distortion of a projected image, such as projected images 16A and 16B of FIGS. 1A and 1B, respectively. Moreover, it will be apparent that many other image surface contours may be used, including but not limited to spherical. Notably, projected image 16B is distorted. Adjustment to remove or reduce this distortion is described below in more detail. The computer 19B can be incorporated into the projector 14, or vice-versa FIG. 1C is a pictorial view of an exemplary embodiment of an image projection system 10C in accordance with one or more aspects of the present invention. Projection system 10C comprises personal digital assistant (PDA) 17, in place of computer 18, and projector 14 for projecting onto image surfaces 15C-1 and 15C-2. Accordingly, projected image 16C may be projected onto more than one imaging surface. In this example, projected image 16C is projected into a corner for imaging onto image surfaces 15C-1 and 15C-2. PDA may be connected to a network, such as a wired connection or an over-the-air ("wireless") network connection, to provide images for projecting or may comprise one or more images for projecting. PDA 17 may comprise an image adjustment program, described below in more detail. Notably, projected image 16C is distorted. Adjustment to remove or reduce this distortion is described below in more detail. The PDA 17 may be incorporated into a projector 14, or vice-versa FIG. 1D is the pictorial view of FIG. 1C for a system portion and a top-down view of FIG. 1C for a projection portion. To a viewing audience located in viewing position with respect to image surfaces 15C-1 and 15C-2, projected image 16C appears as though projected on a virtual projection screen 20. Adjustment to create this optical virtual projection screen effect for projected image 16C is described below in more detail.

For the remainder of this description, for purposes of clarity, only the image projection system 10A will be described, but the remainder of this description can be applied to any configuration.

Figure 2A:
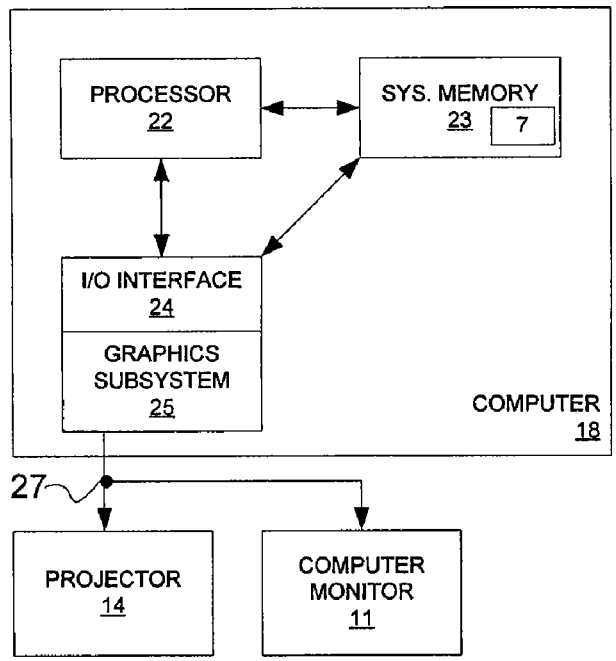
FIGS. 2A and 2B are block diagrams of exemplary portions of respective embodiments of an image projection system of FIG. 1A.

FIG. 2A is a block diagram of an exemplary portion of an embodiment of image projection system 10A in accordance with one or more aspects of the present invention. Computer 18 comprises processor 22, system memory 23, input/output (I/O) interface 24 and graphics subsystem 25. Processor 22 is coupled to system memory 23, I/O interface 24. System memory 23 may be programmed with all or a portion of a driver program 7 for executing instructions in accordance with one or more aspects of the present invention as described below in more detail.

I/O interface may be coupled to system memory 23 for direct memory addressing (DMA). Though computer 18 may be programmed to carry out graphics oriented processing without a separate device for graphics processing, a more efficient use of processor 22 is to have a separate device for graphics processing. Accordingly, graphics system 25 may be coupled to I/O interface 24 in a known manner. Such graphics subsystems are well known, and often take the form of a "card." Moreover, in some instances, a graphics chip set is implemented on a motherboard, and thus no separate graphics card is used, or an optional separate graphics card can still be used, even if motherboard chips perform graphics functions. A key point is that no special circuitry for implementing one or more aspects of the present invention is needed. Rather, one or more aspects of the present invention may be implemented with "consumer off-the-shelf" (COTS) equipment, such as a laptop and a CCD projector. This is an important advantage over systems requiring customized circuit designs or optics for image adjustment.

Figure 2B:
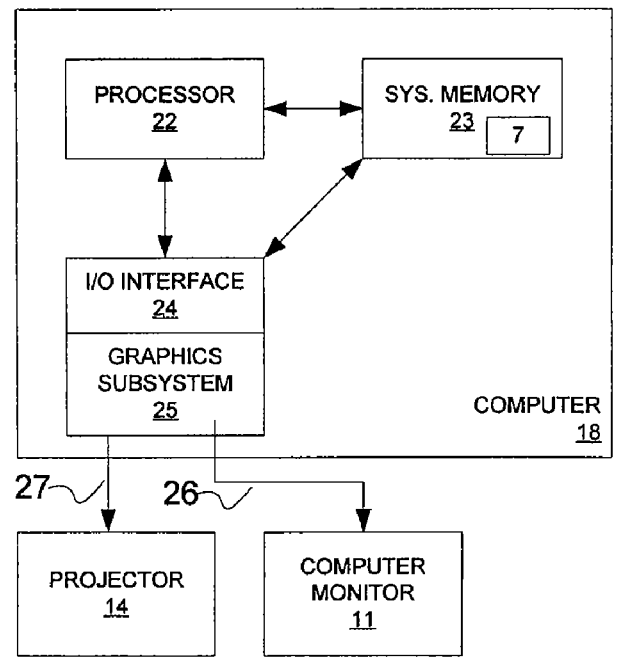

Graphics subsystem 25 may have an output 27 provided to projector 14. This output 27 may further optionally be provided to computer monitor 11, namely, for same image display on multiple display surfaces. However, the block diagram of FIG. 2B is of an exemplary portion of another embodiment of image projection system 10A where graphics subsystem 25 has separate outputs 26 and 27 for displaying same or different images. Thus, an image from image output 27 may be provided to projector 14 and a different image from image output 26 may be provided to computer monitor 11. Advantages associated with an ability to display different images will become more apparent as described below in more detail.

Figure 3:
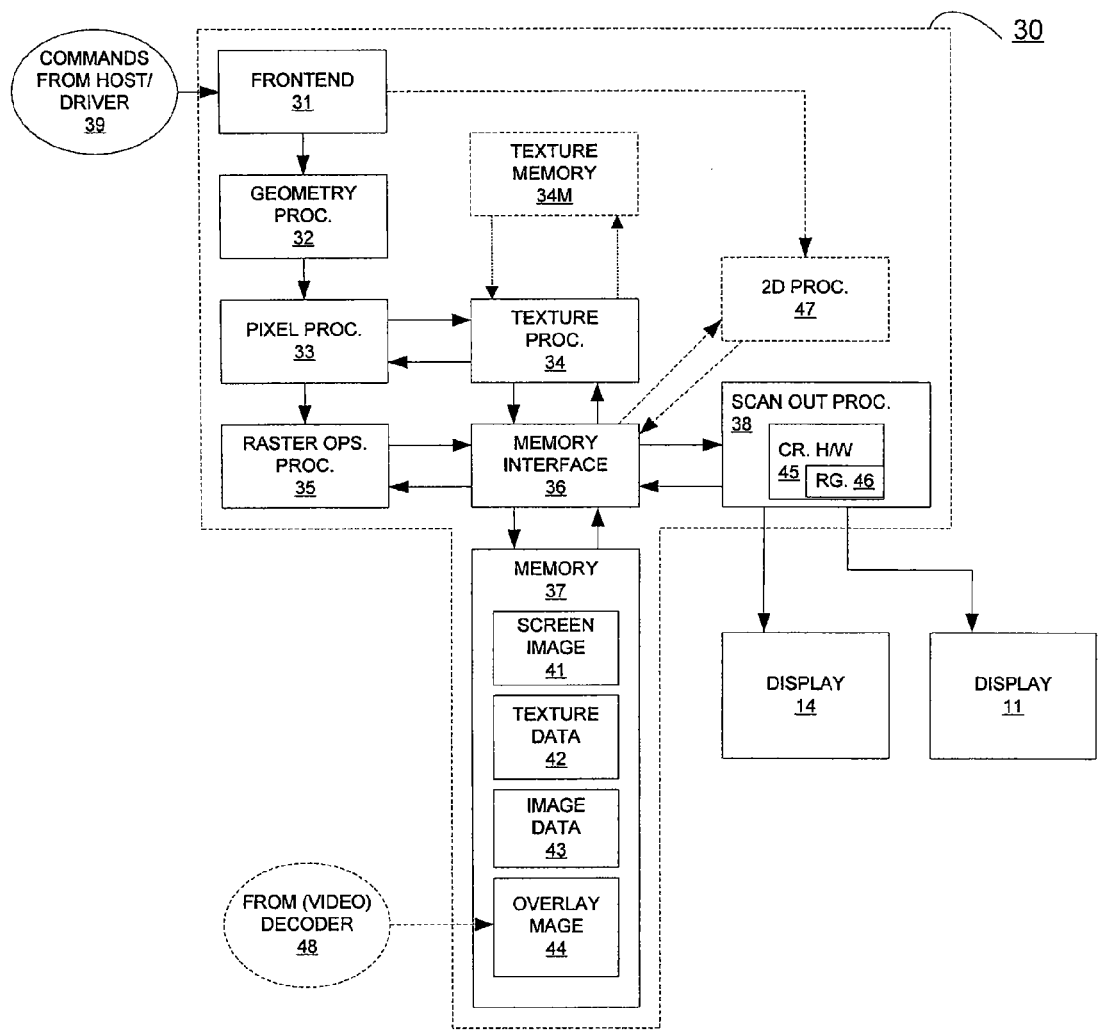
FIGS. 3, 3A and 3B are block diagrams of an exemplary embodiment of a graphics pipelines coupled to displays in accordance with one or more aspects of the present invention.

FIG. 3 is a block diagram of an exemplary embodiment of a graphics pipeline 30 in accordance with one or more aspects of the present invention. Graphics pipelines are accessed by application programs via an Application Program Interface (API), such as OpenGL®, D3D®, and Direct Draw®. For purposes of clarity, graphics pipeline 30 is described as implemented in hardware, though a combination of hardware and software may be used. Graphics pipeline comprises frontend 31, geometry processor 32, pixel processor 33, texture processor 34, raster operations processor 35, memory interface 36, memory or frame buffer 37, scan out processor 38, and optionally two-dimensional (2D) processor 47. Also, optionally texture processor may comprise a memory interface for communicating with a separate texture memory. Scan out processor 38 is coupled to at least one display. So for example, a computer monitor or a television set may have a setup mode, where a displayed image is adjusted to a screen display. Handles, described below in more detail, may be provided to make one or more adjustments to such a displayed image, such adjustments may include one or more of a pincushion adjustment, a trapezoid adjustment, a horizontal size adjustment, a vertical size adjustment, a right pincushion adjustment, a left pincushion adjustment, a right trapezoid adjustment, and a left trapezoid adjustment. Another example is a projected image that may be adjusted for one or more of the same types of adjustments. For reasons that will become more apparent with the detailed description that follows, it may be desirable to have separate outputs to respective displays. Thus, scan out processor 38 may provide an output to display 14, such as a projector, and another output to display 11, such as a computer monitor.

With continuing reference to FIG. 3, and renewed reference to FIG. 2B, commands 39 are received from a host computer, such as computer 18, and such commands 39 may be made through a driver, such as driver 7 in FIGS. 2A and 2B, for a graphics pipeline 30. That is, commands 39 are fed into the graphics pipeline, producing an image 43, the image stored in memory 3. Commands 39 may be in response to a program application, an operating system or other computer program having an image to be displayed. So, for example, suppose commands 39 are to make an image characterized by image data 43 to be stored in memory 37. That is, commands 39 are fed into the graphics pipeline, producing an image 43, the image stored in memory 37. Commands 39 may also indicate a range of addresses for memory 37 in which to write generated image data 43. Furthermore, display lists 39 may be used, which are commands that are bundled together and invoked by another command.

Commands 39 are provided to frontend 31, which manages DMA, buffering commands and the like for geometry processor 32. Geometry processor 32 processes polygons and performs transforms, such as translation, scaling, rotation, field-of-view, and depth test near and far field clipping, among others, for such an image to be made. Pixel processor 33 associates data to pixels for such an image 43 to be made.

Texture processor 34 generates texture values from texels stored as texture data 42, which texture data 42 can be stored in graphics subsystem memory 37, texture memory 34M, or system memory 23. Texture processor 34 performs interpolation, including but not limited to nearest, bilinear, trilinear and anisotropic interpolation amongst texels. Interpolation of texture coordinates, used to select texels for interpolation, includes plane equation and barycentric. Because some texel values are reused, texture processor 34 may cache texels to reduce repetitive reads from memory. Optionally, one or more coarser resolutions of image data 42 may be generated, for use in interpolation.

Raster operations processor 35 may blend, perform logic operations, and other known operations for such pixels. Memory interface 36 receives image data 43, in the form of pixel values and writes it to memory 37. Alternatively, commands 39 may be provided to 2D processor 47 to generate image data 43 and store it in memory 37 via memory interface 36.

Though image data 43 may be output for display 14 via memory interface 36 and scan out processor 38, as instructed by a host computer 18, other operations for adjusting image data may be done with instruction from host computer 18 or without instruction by host computer 18, namely, "behind" an operating system of host computer 18. These operations behind the operating system are to provide at least one of a graphic user interface and an adjustable image.

Texture data 42 is obtained from image data 43 and written to memory 37. Optionally, image data 43 may be copied for creation of texture data 42.

Figure 9A:
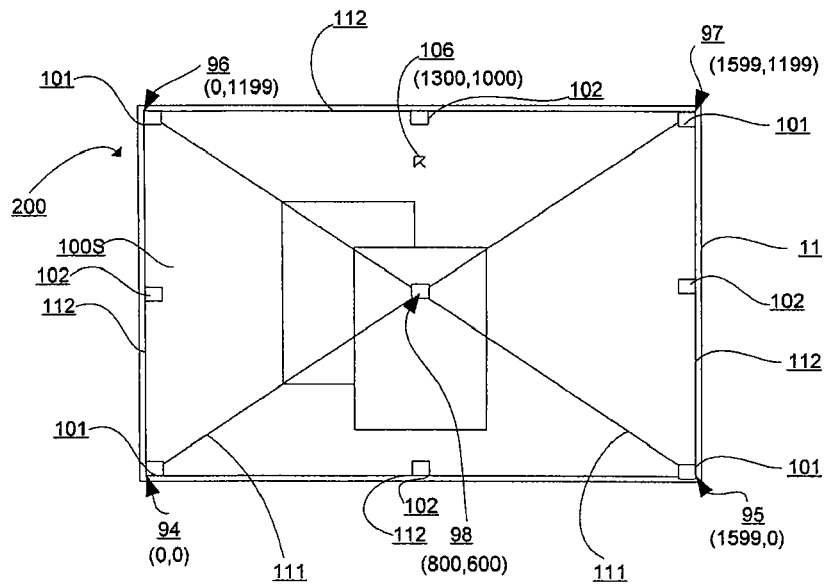
FIG. 9A is a block diagram of an exemplary embodiment of a computer screen having a screen image displayed thereon in accordance with one or more aspects of the present invention.

FIG. 9A is a block diagram of an exemplary embodiment of a computer screen 11 having a screen image 100S displayed thereon in accordance with one or more aspects of the present invention. Displayed with image 101S is a graphical user interface (GUI) 200. This GUI 200 comprises handles 101, optional handles 102, optional guide lines 111 and 112, and an optional center handle 107. When available, a user may select and move center handle 107 to adjust for foreshortening, also referred to sometimes as anisotropic geometric distortion. Thus, center handle 107 may be moved for anisotropic filtering. Alternatively, location of a relative center, namely, where corner-to-corner guide lines intersect, for an adjusted image may be done by calculation using adjusted locations of points 94, 95, 96, and 97, but it is generally advantageous to have the center handle 107 positioned independently by the user.

To adjust a projected image, 16A, 16B and 16C, a user requests GUI 200 be displayed on a computer desktop stored as image data 43. GUI 200 allows the user to move or change position of handles 101, 102, 107, thereby adjusting display or projection of image data 43. Handles 101, 102, 107 correspond to polygon vertices, so moving handles 101, 102, 107 causes movement of such associated of vertices. Projected image 16A, 16B, 16C is created by using image 43 of a computer desktop as a texture map on the polygons. Moving handles moves vertices of associated polygons causing a stretching or shrinking of the displayed computer desktop. Texture coordinates assigned to the vertices can be equal to the corresponding (X,Y) location in the computer desktop before adjustment.

If both a monitor 11 and a projector 14 are present, display of GUI 200 on computer screen of monitor 11 is optional. Accordingly, as it will be understood how a computer screen 11 may be adjusted with GUI 200, or a form thereof, in view of how a projected image is adjusted, it will be assumed that screen display 11 is not being adjusted. Rather, adjustment of a projected image will be described, as adjusting a projected image descriptively covers adjusting a computer screen image.

Example, using FIG. 9A, assume computer screen 11 is in a 1600×1200 resolution mode, though other well-known modes may be used. Vertices of polygons mapping screen image 100S are at points 94, 95, 96, 97, and 98 with screen coordinates (0,0), (1599,0), (0,1199), (1599,1199), and (800, 600), respectively. Cursor 106 is at screen coordinates (1300, 1000) for purposes of example.

Figure 9B:
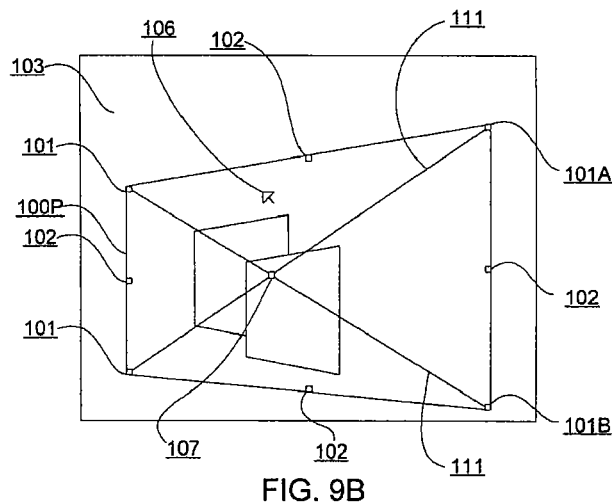
FIG. 9B is a block diagram of a projected image of the screen image of FIG. 9A in accordance with one or more aspects of the present invention.

FIG. 9B is a block diagram of a projected image 100P of screen image 100S of FIG. 9A onto an imaging surface 103, such as a screen, a wall or a whiteboard, among other types of surfaces. Projected image 100P is an unadjusted image.

Figure 9C:
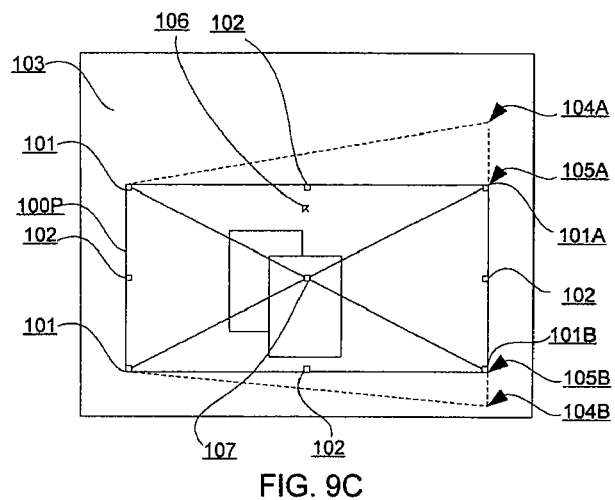
FIG. 9C is a block diagram of the projected image of FIG. 9B after adjustment in accordance with one or more aspects of the present invention.

FIG. 9C is a block diagram of projected image 100P of FIG. 9B after adjustment in accordance with one or more aspects of the present invention. To adjust an image, a user selects a portion of an image to be moved by selecting and moving or dragging a handle associated with that portion. Selection and movement of handles may be done with a mouse, a keyboard, a graphics tablet, a touch screen, or other cursor-pointing device. By way of example, to adjust projected image 100P, handle 101A may be selected and dragged from location 104A to location 105A, and handle 101B may be selected and dragged from location 104B to location 105B. Dashed lines are used to indicate position of projected image 100P prior to adjustment.

Figure 9D:
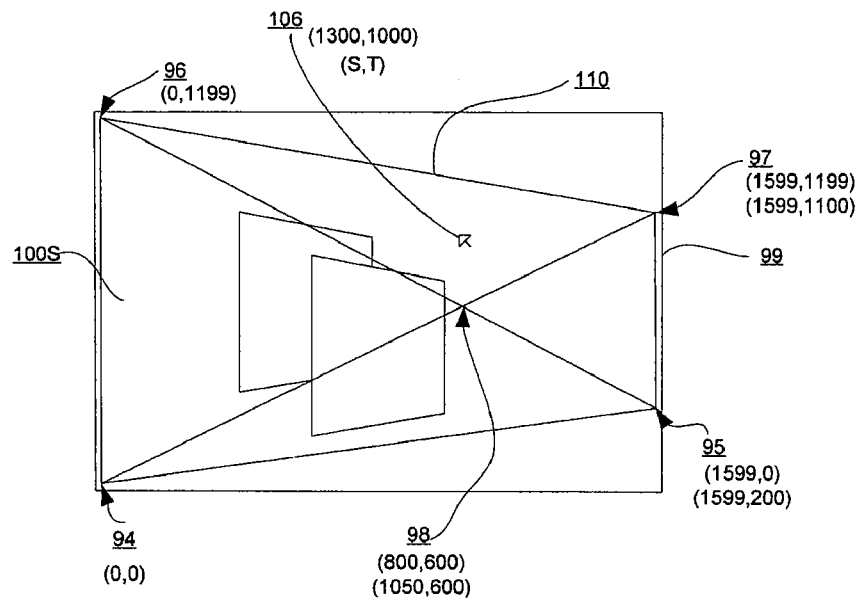
FIG. 9D is a block diagram of the screen image of FIG. 9A for the projected image of FIG. 9C in accordance with one or more aspects of the present invention.
Figure 9E:
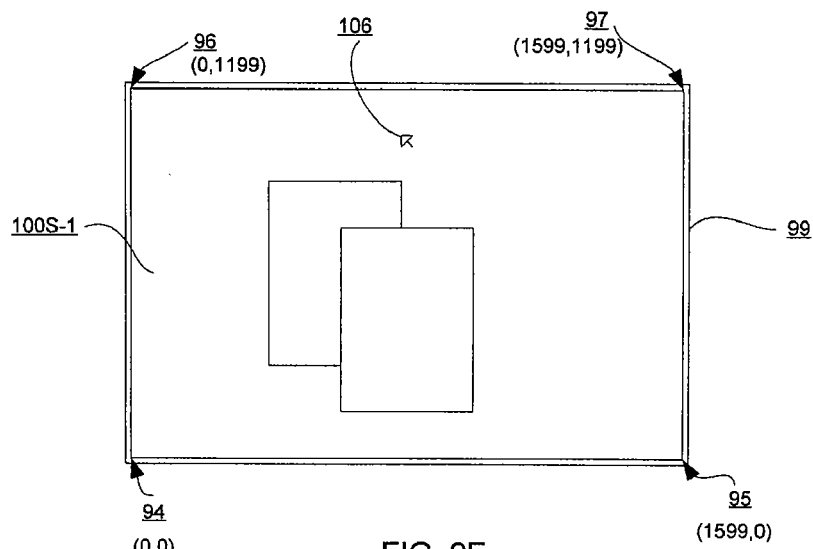
FIG. 9E is a block diagram of the screen image of FIG. 9A for the projected image of FIG. 9C after toggling back to an unadjusted screen image and after turning off an adjustment graphical user interface (GUI) in accordance with one or more aspects of the present invention.
Figure 10:
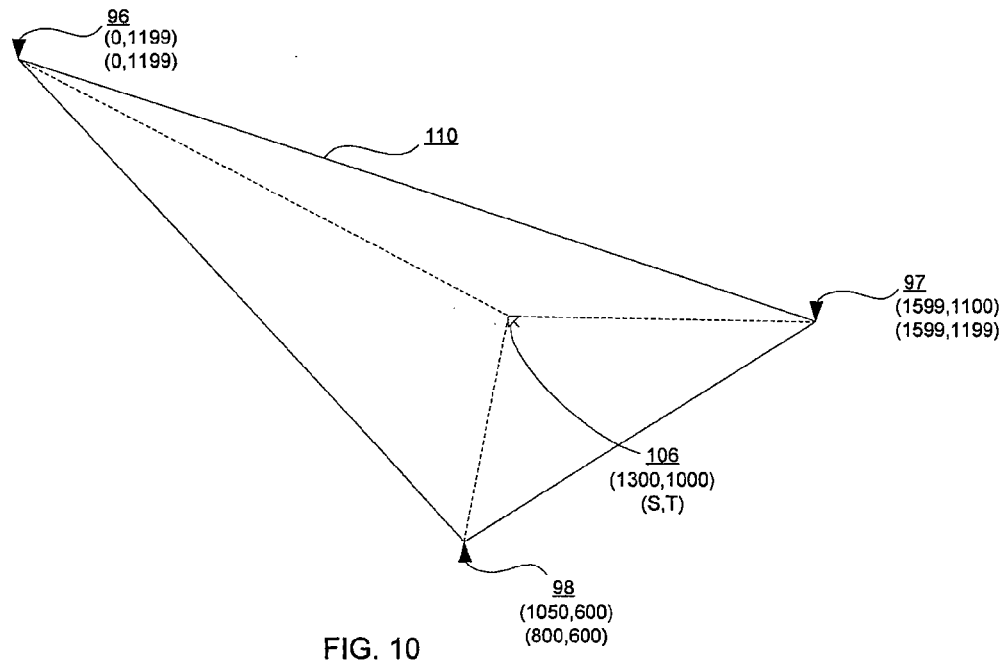
FIG. 10 is an enlarged version of adjusted polygon of FIG. 9D.

Adjustment of projected image 100P effects screen image 100S, as indicated in the block diagram of FIG. 9D. This is, if projector 14 and screen 11 are displaying the same computer desktop or portion thereof, adjusting image 100P (projected by projector 14) to be rectangular will also cause distortion of screen image 100S (as seen on screen 11). In the example of FIGS. 9E and 9D, by adjusting projected image 100P to be rectangular, screen image 100S is keystoned or becomes trapezoidal. Continuing the above example, screen coordinates for points 94, 95, 96, 97, and 98 are now (0,0), (1599,200), (0,1199), (1599,1100), and (1050,600), respectively. Cursor 106 is at screen coordinates (1300,1000) for purposes of example. Texture coordinates for points or vertices 94, 95, 96, 97, and 98 are (0,0), (1599,0), (0,1199), (1599,1199), and (800,600), respectively, as these are equal to the (X,Y) locations in the non-adjusted image 43 or texture data 42 if the image 43 has been copied to a different location as a texture map. However, adjusting image data 43 (e.g., a computer desktop) will cause a different mapping between pixel locations and any icon that appears within the image 43. For example, if a button is displayed on an adjusted image 100S, and a user moves a mouse pointer 106 to point at the button, the mouse click that sends the (X,Y) location of the pointer within the display 11 will be wrong. Therefore, the true pointer location must be determined. To determine the location of cursor 106, the texture coordinates of triangle 110 are interpolated to determine texture coordinates (S,T) using barycentric coordinates or a plane equation as shown in FIG. 10.

FIG. 9E is a block diagram of screen image 100S-1 after adjustment of projected image 100P and after turning off GUI 200. However, screen image 100S-1 of FIG. 9E is screen image 100S of FIG. 9A and not screen image 100S of FIG. 9D. This may be done by having scan out processor 38 with separate outputs and a stored unadjusted version of image data 43 to display. Moreover, toggling between screen images 100S and 100S-1 may be done by a user with selection of a key on a keyboard, such as a function key.

Figure 9F:
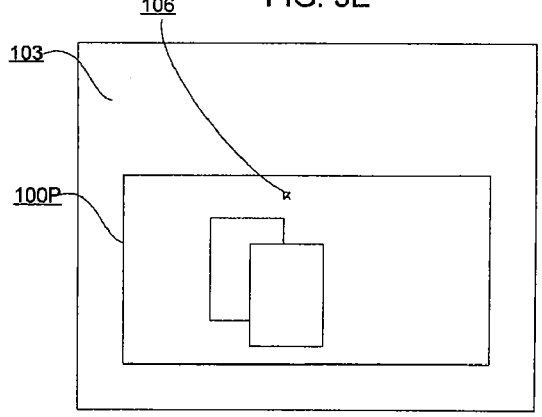
FIG. 9F is a block diagram of the projected image of FIG. 9C after turning off an adjustment GUI in accordance with one or more aspects of the present invention.

FIG. 9F is a block diagram of projected image 100P after adjustment and after turning off GUI 200. Notably, positions of cursors 106 in FIGS. 9E and 9F track with one another. However, because an adjusted image has different screen coordinates than an unadjusted image, a cursor tracking routine is used to allow display of adjusted and unadjusted images with a common cursor, including common cursor movement. That is, scan out processor 38 can have two hardware cursors.

With continuing reference to FIGS. 9A through 9F and renewed reference to FIGS. 2B and 3, as previously described, image data 43 comprises mapping of polygons, where each polygon has vertices. Coordinates of these vertices, or coordinates related to these vertices, are stored as texture coordinates. These texture coordinates are held constant though screen coordinates of image data 43 are changed by adjustment of projected image 100P.

Figure 3A:
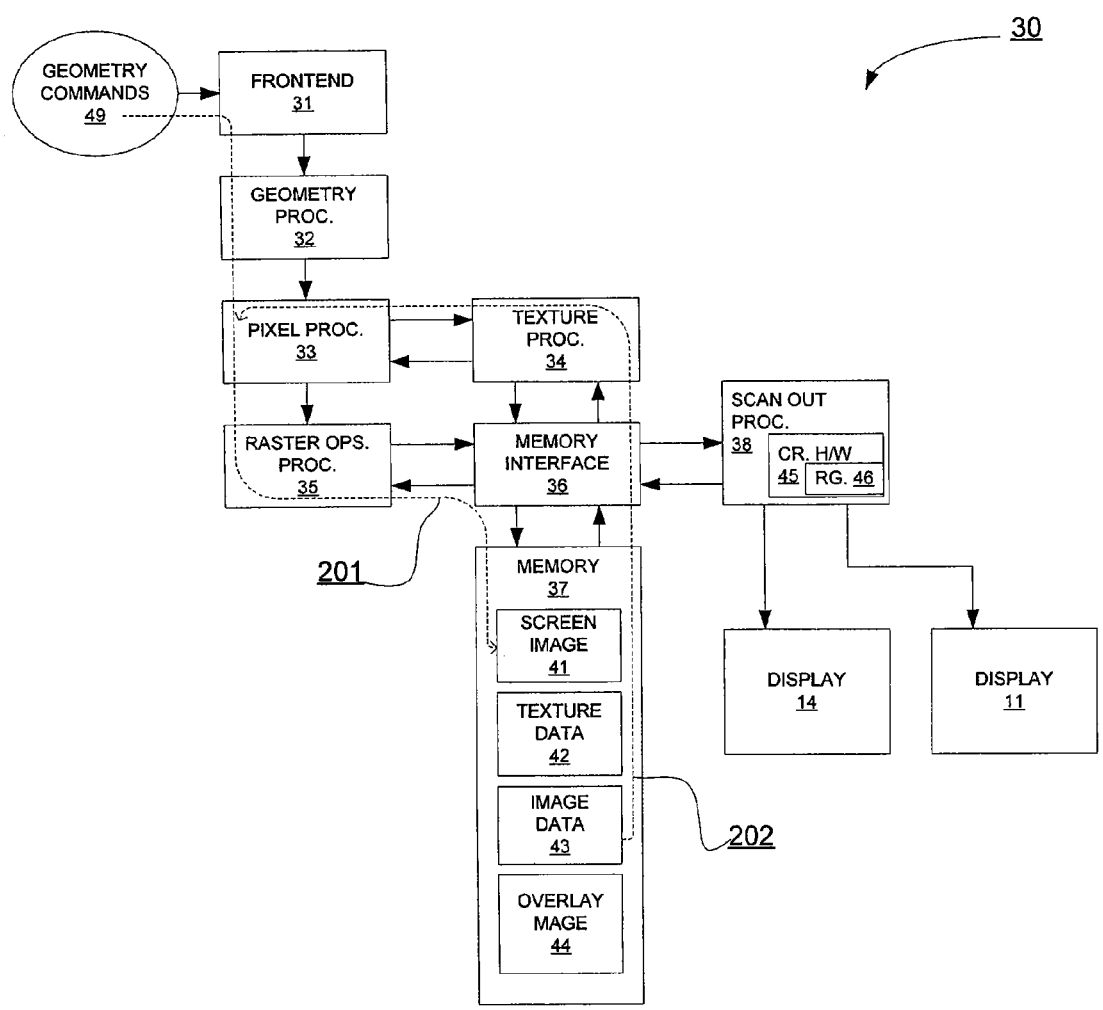
Figure 3B:
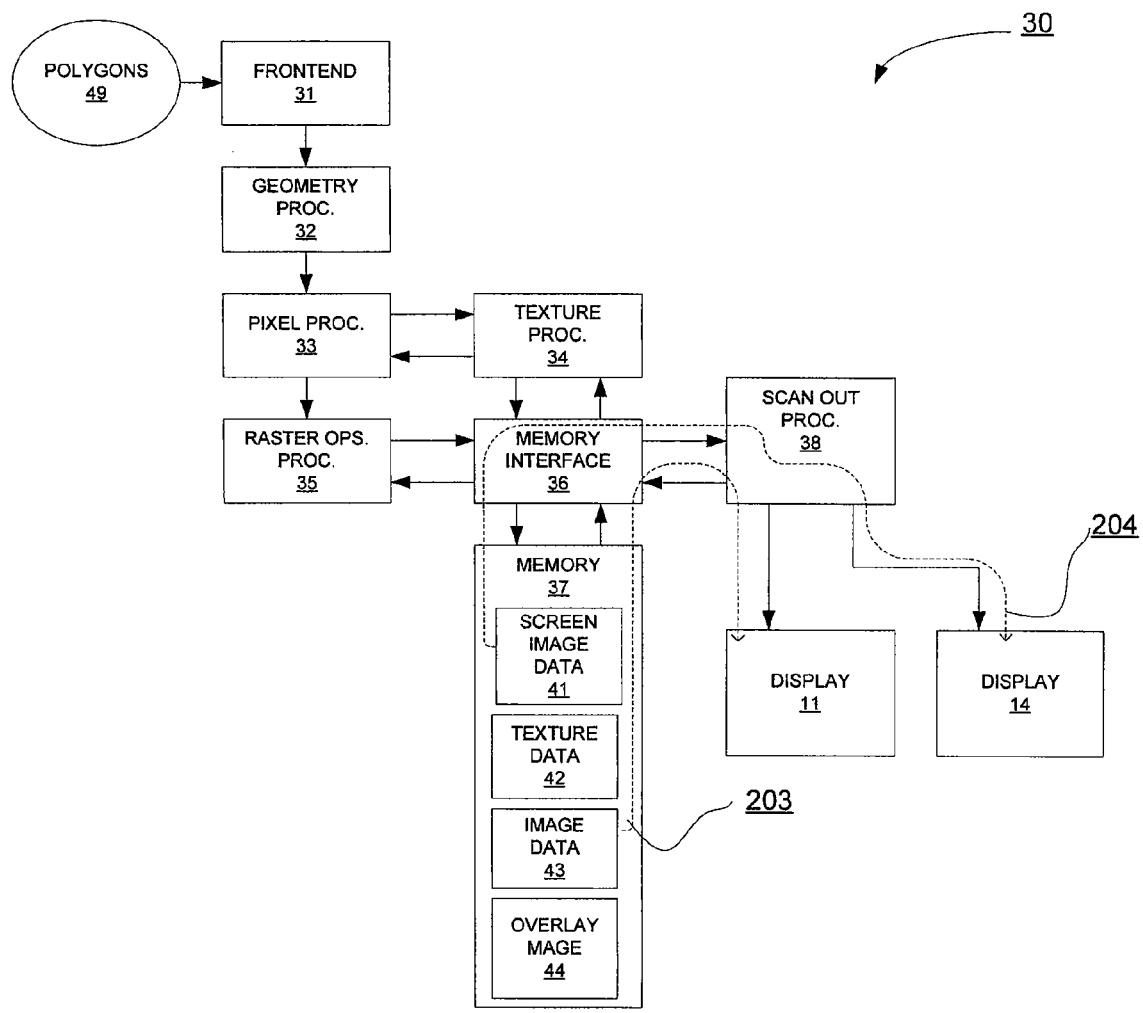

FIGS. 3A and 3B are block diagrams of an exemplary embodiment of a graphics pipeline coupled to two displays receiving separate scan outputs in accordance with one or more aspects of the present invention. With continuing reference to FIGS. 3A and 3B, and renewed reference to FIGS. 2B, 3, and 9A through 9F, in response to a user moving at least one handle of handles 101, 102 or 107, geometry commands 49 are provided to frontend 31, as indicated by dashed line 201. Geometry processor 32 in response to geometry commands 49 redraws polygons for a new screen image to be generated, for example adjusted screen image of FIG. 9D. Image data 43 (being the non-adjusted image data) is retrieved from memory 37 (where the image of the computer desktop is stored and accessible as a texture) and provided to texture processor 34, as indicated by dashed line 202. Alternatively, texture data 42 may be used instead of image data 43, if image data is converted to texture data. Pixel processor 33 receives texture information, as indicated by dashed line 202, from texture processor 34 and polygon data from geometry processor 32, as indicated by dashed line 201, and provides pixels for an adjusted image. These pixels may have other known raster operations done to them by raster operations processor 35, and are stored into screen image data 41, as indicated by dashed line 201. Screen image data 41 is an adjusted or warped image as indicated in FIG. 9D; however, this adjusted screen image data 41 is provided to scan out processor 38 for output to projector 14 for projection as an adjusted image, for example as in FIG. 9F and as indicated by dashed line 203. In other words, a user can adjust or warp an image using GUI 200 to provide and adjusted or unwarped projected image.

With separate outputs from scan output processor 38, an unadjusted version of image data 43 may be provided to scan out processor 38 for display on computer monitor 11 in order to provide an unwarped screen image, for example as in FIG. 9E and as indicated by dashed line 204. However, because screen image data 41 has different screen coordinates than image data 43, cursor tracking may be used to avoid informing an operating system of an incorrect cursor position. Alternatively, either screen image data 41 or image data 43 may be used as a cursor control screen for informing an operating system of position of cursor 106. Alternatively, a cursor may be treated like an overlay where a block transfer is used, as described below in more detail.

Figures 4, 5:
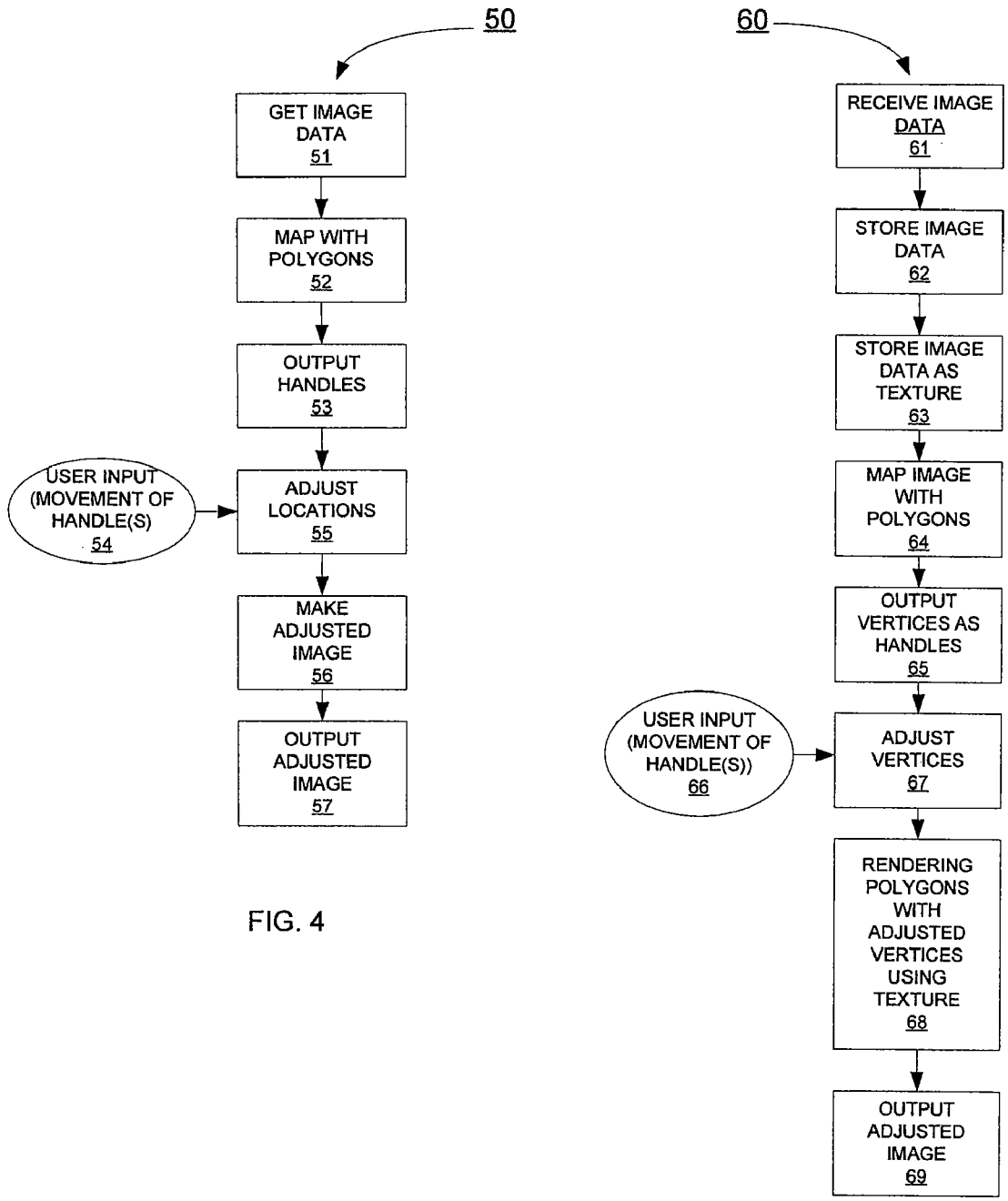
FIGS. 4, 5, 6 and 7 are process flow diagrams of exemplary embodiments of display image adjustment processes in accordance with one or more aspects of the present invention.

FIG. 4 is a process flow diagram of an exemplary embodiment of a display image adjustment process 50 in accordance with one or more aspects of the present invention. At step 51, image data is obtained (e.g., an operating system and/or application programs generate commands that create a computer desktop image). At step 52, image data obtained is mapped with polygons (e.g., a plurality of polygons that have the computer desktop as a texture, each polygon vertex having a texture coordinate in the computer desktop image texture). At step 53, handles associated with such polygons are provided as part of a display output (e.g., a handle is displayed at each polygon vertex, polygons that share a vertex share a corresponding handle). At step 54, a user moves one or more handles to provide user input (e.g. using a GUI the user reduces the projection distortion of the computer desktop). At step 55, locations are adjusted in response to such user input (e.g., the locations of the vertices are moved, thereby changing the shape of the polygons). At step 56, an adjusted image is made with adjusted locations for image data (e.g., the polygons are rendered using the new vertex locations, creating an adjusted image). At step 57, an adjusted image is output for display (e.g., the rendered polygons are displayed).

FIG. 5 is a process flow diagram of an exemplary embodiment of a display image adjustment process 60 in accordance with one or more aspects of the present invention. At step 61, image data is received (e.g., commands and/or pixels), and such image data received is stored at step 62. At step 63, stored image data is stored as texture (this can be simply accessing the stored image as a texture, thereby eliminating restoring of data). Stored texture is mapped with polygons at step 64. At step 65, at least a portion of polygon vertices from step 64 are output for display as handles. At step 66, a user inputs image adjustment data by selecting and moving handles provided at step 65. At step 67, polygon vertices output as handles and moved by a user are adjusted in response to such user movement of the handles. At step 68, an adjusted image is generated by rendering polygons with adjusted vertices from step 67 using such texture stored at step 63. At step 69, an adjusted image from step 68 is output for display.

Figures 6, 7:
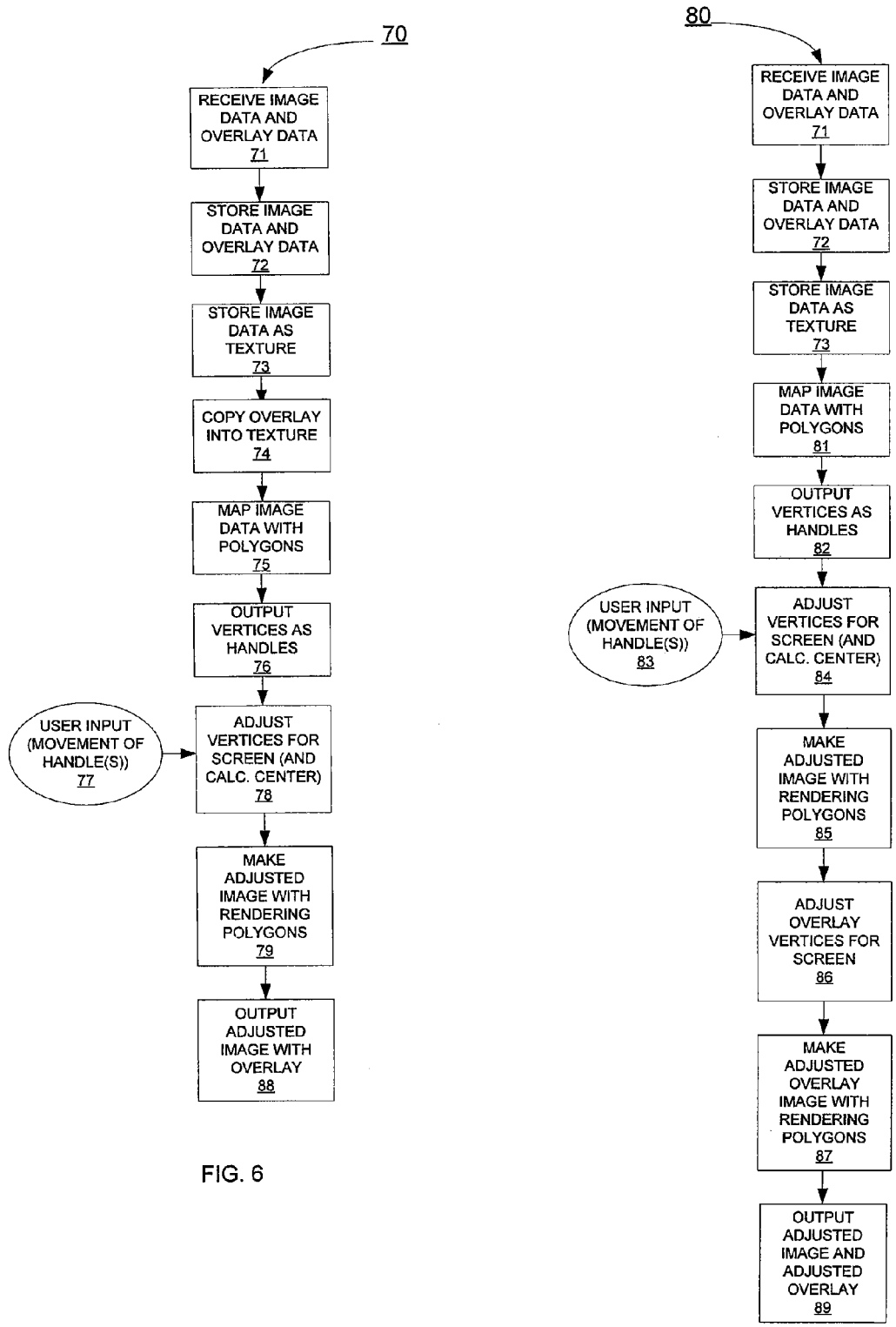

FIG. 6 is a process flow diagram of an exemplary embodiment of a display image adjustment process 70 in accordance with one or more aspects of the present invention. At step 71, image data and overlay data is received. It should be appreciated that overlay data may be provided from a decoder, such as a video decoder 48, to memory 37, as shown in FIG. 3. Additionally, a cursor is a type of overlay, and may be handled in a similar manner. However, for purposes of clarity, overlay data is described as a video overlay. At step 72, image data and overlay data are stored. At step 73, image data is stored as texture. At step 74, overlay data is copied into texture. This may be done by a block transfer (BLT). At step 75, image data is mapped with polygons. At step 76, handles are output, where such handles are associated with vertices of mapped polygons at step 75. At step 77, a user provides image adjustment information by moving one or more handles output at step 76. At step 78, one or more vertices are adjusted for a screen image in response to user input from step 77. A centrally located handle may be output at step 76 for user movement at step 77 for adjustment of a displayed image. At step 79, an adjusted image is generated by rendering polygons with adjusted vertices from step 78 using image data stored as texture at step 73 and overlay data copied into texture at step 74. At step 88, an adjusted image with an overlay is output for display. It should be understood that an overlay image is also adjusted in response to user input as such overlay was converted to texture.

FIG. 7 is a process flow diagram of an exemplary embodiment of a display image adjustment process 80 in accordance with one or more aspects of the present invention. At step 71, image data and overlay data are obtained. At step 72, image data and overlay data is stored. At step 73, image data is stored as texture. At step 81, image data stored as texture at step 73 is mapped with polygons. At step 82, handles associated with vertices of mapped polygons are output. At step 83, user input image adjustment information, from moving one or more handles, is obtained. At step 84, one or more vertices are adjusted for a screen image in response to user input obtained at step 83. A centrally located handle may be output at step 82 for user movement input at step 83 for anisotropic adjustment of a displayed image. At step 85, an adjusted image is generated by rendering polygons with adjusted vertices of step 84. At step 86, vertices for such an overlay image stored at step 72 are adjusted corresponding to adjustment at step 84 for a screen image. It should be understood that overlay data is being treated as a separate texture rendered onto separate polygons. At step 87, an adjusted overlay image is generated by rendering it with polygons with adjusted vertices from step 86. At step 89, an adjusted image with an adjusted overlay is output for display.

Another approach to an overlay would be to provide handles as is described above for an image to be adjusted. However, tracking without specialized hardware may impact speed.

A cursor may be treated as an overlay as described above; however, with renewed reference to FIG. 3, a conventional scan out processor 38 comprises cursor hardware 45 including cursor register 46. Cursor hardware 45 receives incoming pixel information and determines which pixels to overlay or substitute cursor pixels stored in cursor hardware 45 based on cursor location stored in cursor register 46. This speeds up cursor operation.

Figure 8:
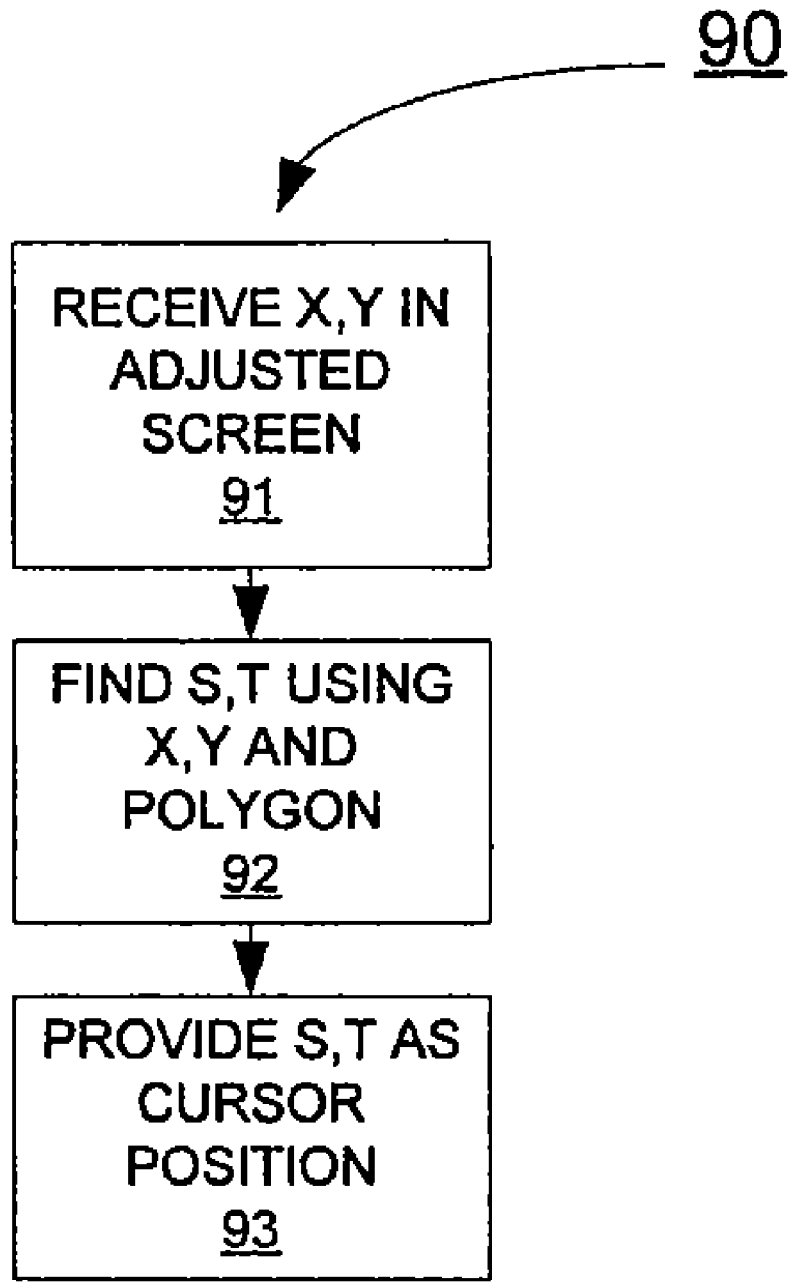
FIG. 8 is a process flow diagram of an exemplary embodiment of a cursor tracking routine in accordance with one or more aspects of the present invention.

FIG. 8 is a process flow diagram of an exemplary embodiment of a cursor tracking routine 90 in accordance with one or more aspects of the present invention. At step 91, X and Y coordinates for adjusted screen image are obtained. At step 92, S and T coordinates in a texture map are determined. S and T may be determined by interpolation from X and Y coordinates obtained in step 91 with vertex coordinates for a polygon in which a cursor is located. This may be done with barycentric interpolation or plane equation partial derivatives. At step 93, S and T coordinates are provided to a host computer, such as computer 18, operating system as cursor position. Notably, cursor tracking routine 90 is reversible, namely, if S and T coordinates are obtained at step 91, then X and Y coordinates may be determined at step 92 and output as cursor position at step 93. Accordingly, it depends on which image, namely, a project image or a computer screen display image, is selected as a reference display. Moreover, screen coordinates for an unadjusted image, for example stored image 43 of FIG. 3, may be determined in a similar manner or used to determine texture coordinates, again depending on what is the reference display.

Continuing the above example, FIG. 10 is an enlarged version of adjusted polygon 110 of FIG. 9D, namely, a portion of an adjusted computer screen image. Notably, though polygon 110 is a triangle, other known types of polygons for computer graphics may be used. Point or vertex 96 has screen X- and Y-coordinates (0,1199) and texture S- and T-coordinates (0,1199). Vertex 97 has screen X- and Y-coordinates (1599,1100) and texture S- and T-coordinates (1599,1199). Vertex 98 has screen X- and Y-coordinates (1050,600) and texture S- and T-coordinates (800,600). Accordingly, texture coordinates are unchanged by one or more changes in adjusted image screen coordinates. Moreover, cursor position on a screen is determinable, in this example cursor vertex 106 has screen X- and Y-coordinates (1300,1000). Interpolation may be used to find corresponding texture coordinates S and T to X- and Y-coordinates (1300,1000) at point 106.

With renewed reference to FIG. 3, for a dual cursor embodiment, both X and Y screen coordinates and S and T texture coordinates are stored in cursor register 46. S and T texture coordinate located cursor image is provided as output to projector 14, and X and Y screen coordinate located cursor image is provided as output to computer monitor 11. Notably, both sets of X and Y screen coordinates, namely, for an unadjusted image coordinates $(X_u, Y_u)$ such as for image data 43 or an adjusted image coordinates $(X_a, Y_a)$ such as for FIG. 9D, may be stored in cursor register memory 46 and used for toggling between unadjusted and adjusted images on computer monitor 11.

Some embodiments of the present invention are program products that may reside in whole or in part in memory. By way of example and not limitation, memory may be sufficient to hold at least a portion of one or more of process 50, 60, 70, 80, and 90 in accordance with one or more embodiments of the present invention. Memory may comprise volatile and/or non-volatile memory, including but not limited to magnetically readable memory (e.g., floppy disk, hard disk, and the like), optically readable memory (e.g., CD-ROM, -RW, DVD-ROM, -RAM, and the like), and electrically readable memory (e.g., DRAM, SRAM, EEPROM, registers, latches, and the like). Accordingly, some embodiments of the invention are program products containing machine-readable programs. The program(s) of the program product defines functions of the embodiments and can be contained on a variety of signal/bearing media, which include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

Notably, number of handles displayed may be increased or decreased depending on projector setup. For example, if a projector is always set to one side of a room, fewer handles may be displayed, and if an imaging surface is more complex than a planar screen, such as a cylinder or a sphere, then more handles may be displayed. Thus, a user may be requested to select a type of surface, if other than a default planar surface. One type of surface a user may select may actually involve more than one surface, such as projection into a corner between two walls.

Figure 11:
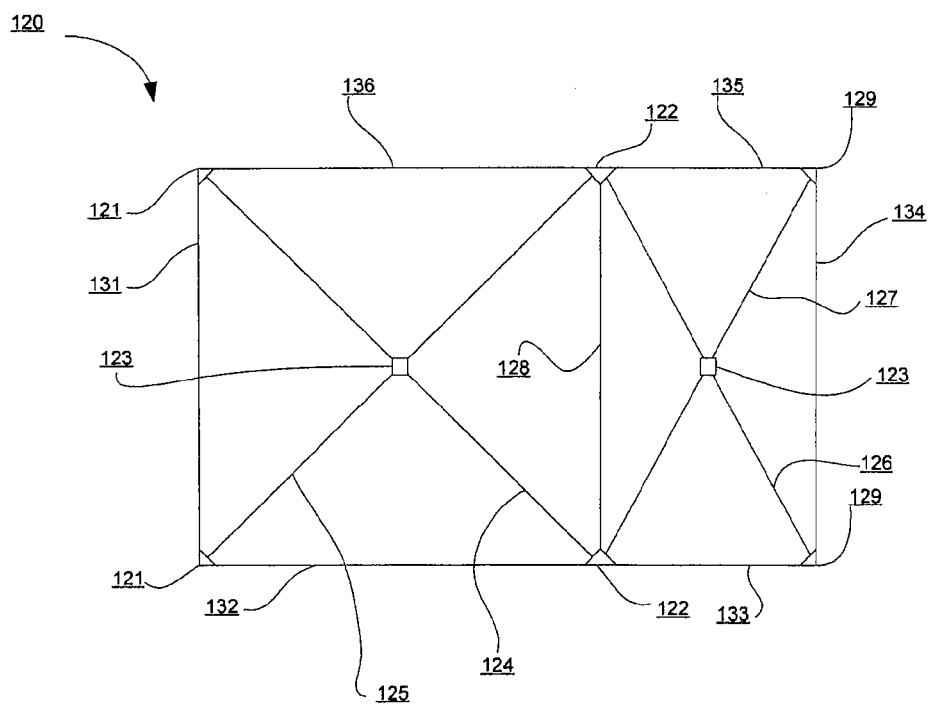
FIG. 11 is a block diagram of an exemplary embodiment of a corner adjustment GUI in accordance with one or more aspects of the present invention.

FIG. 11 is a block diagram of an exemplary embodiment of a corner adjustment GUI 120 in accordance with one or more aspects of the present invention. Corner adjustment GUI 120 comprises at least six handles 121, 122 and 129. Corner adjustment GUI 120 may further comprise one or more of optional handles 123, optional corner guide line 128 extending between handles 122, optional guide lines 124, 125, 126 and 127 diagonally extending between handles 121, 122 and 129, and optional guide lines 131 through 136 forming a perimeter. Handles 122 divide corner adjustment GUI 120 into two surface projection portions.

Figure 12A:
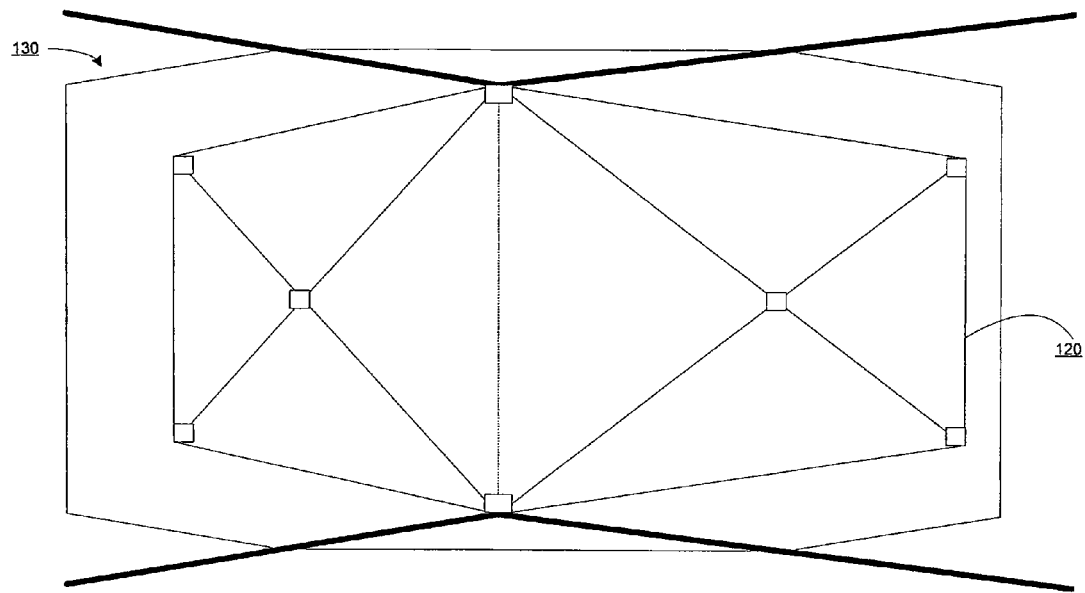
FIG. 12A is a planar view of a corner projection with the corner adjustment GUI of FIG. 11 and an unadjusted image in accordance with one or more aspects of the present invention.
Figure 12B:
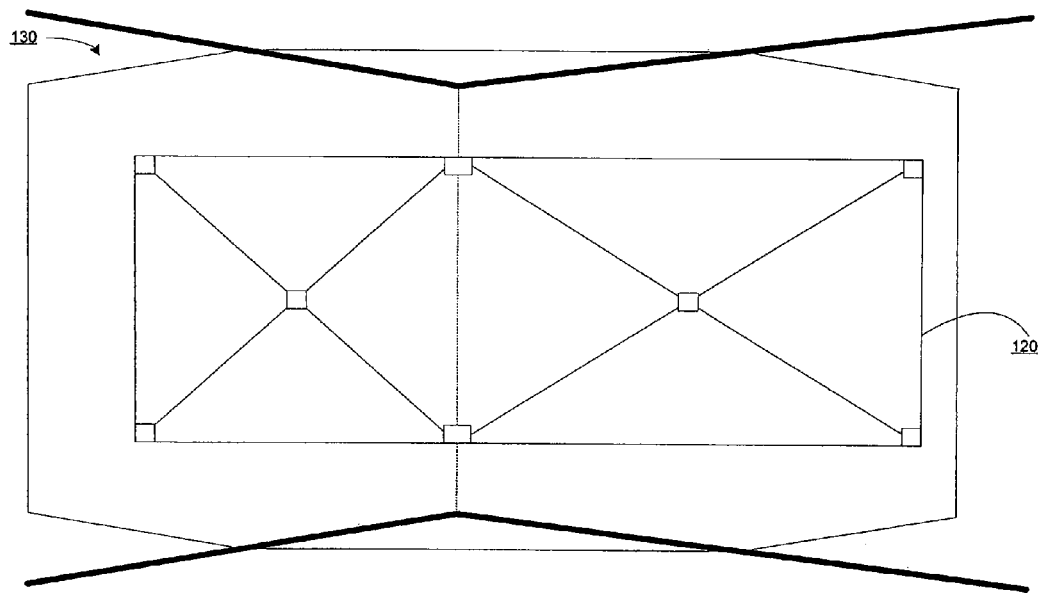
FIG. 12B is a planar view of corner projection with the corner adjustment GUI of FIG. 11 and an adjusted image in accordance with one or more aspects of the present invention.

FIG. 12A is a perspective view of a corner projection 130 with corner adjustment GUI 120 and an unadjusted image in accordance with one or more aspects of the present invention. FIG. 12B is a perspective view of corner projection 130 with corner adjustment GUI 120 and an adjusted image in accordance with one or more aspects of the present invention. Notably, such an adjusted image will appear to a viewer as imaging on a virtual screen, as described above. Having an ability to project onto multiple planar surfaces increases likelihood of projecting an image sufficiently large and positioned for viewing by an audience.

While the above description has been in terms of a computer monitor and a portable projector in some embodiments, it should be understood that other embodiments may be used. For example, rather than a computer monitor or a portable projector, a digital theater projector, a heads-up display, cell phone display, a portable game display, a GPS, an automotive display and the like, among other types of displays may be used. In particular, projectors may be adjusted to compensate for projected off-center distortion or lens magnified-distortion, such as for a micro-LCD. Moreover, integrated chip scale displays for mobile systems may be adjusted. Furthermore, cable, satellite and home theater setup may employ adjustment in accordance with one or more aspects of the present invention for a digital television or monitor. Other surfaces that may be used for projection include mist, a curved windshield and the like. Additionally, as television broadcasts, especially sports, are limited to certain field-of-views, though limited "reverse angle" viewing is available, the present invention may be used to mix a digital image to adjust imagery for different field-of-views.

It should be appreciated that keystone (trapezium) and focal point adjustment in accordance with one or more aspects of the present invention may be used for perceptibly real-time adjustment with fidelity to the original image, namely, with perceivably lossless picture quality. Real-time adjustment compensation is useful for 3D and high frame rate digital projection.

It should be appreciated that embodiments of the present invention operate independently of projection platform. Thus, wide spread deployment is facilitated by cross-platform usage.

Furthermore, it should be appreciated that pixel shading in a graphic display may be adjusted with one or more embodiments of the present invention. In addition to shading, other known features in a graphic image may be independently adjusted.

While foregoing is directed to the preferred embodiment of the present invention, other and further embodiments of the invention may be devised without departing from the basic scope thereof, and the scope thereof is determined by the claims that follow. All trademarks are the respective property of their owners. Claims listing steps do not imply any order of the steps.

What is claimed is:

1. A portable device configured for displaying a graphic user interface for adjusting an image, comprising:
   memory configured to:
      store the image as a texture,
      store a program product that is configured to provide vertices for the image and to provide handles for projection with the image and associated with the vertices, wherein the handles are moveable for adjusting the screen coordinates of the image, and
      store texture coordinates related to the vertices, wherein the texture coordinates are held constant when screen coordinates of the image are changed during the adjusting of the image.

2. The portable device of claim 1, wherein adjusting the image comprises performing one or more of a pincushion adjustment operation, a trapezoid adjustment operation, a horizontal size adjustment operation, a vertical size adjustment operation, a right pincushion adjustment operation, a left pincushion adjustment operation, a right trapezoid adjustment operation, and a left trapezoid adjustment operation.

3. The portable device of claim 1, wherein the handles are moveable with a mouse, a keyboard, a graphics tablet, a touch screen, or other cursor-pointing device.

4. The portable device of claim 1, further comprising a display, wherein the graphic user interface is displayed on the display.

5. The portable device of claim 4, wherein the image is projected onto a surface to produce a projected image.

6. The portable device of claim 1, wherein the image is projected onto a surface to produce a projected image that is trapezoidal and moving the handles to adjust the image causes the projected image to become rectangular.

7. The portable device of claim 6, wherein the moving of the handles to adjust the image causes the image to become trapezoidal.

8. The portable device of claim 1, wherein the image stored as a texture a computer desktop image and the vertices are located at corners of the computer desktop image.

9. A method for displaying a graphic user interface, the method comprising:
    sending the graphic user interface to a first display;
    storing the graphic user interface as a texture;
    rendering a plurality of polygons, each polygon comprising vertices, at least some of the vertices associated with texture coordinates within the texture;
    rendering a plurality of handles, at least some of the handles associated with some of the vertices;
    sending the rendered polygons and rendered handles to a second display device; and
    receiving locations of the handles, the received locations affecting the associated vertices, thereby changing the rendered polygons, wherein the texture coordinates are held constant when the screen coordinates of the handles are moved.

10. The method of claim 9, wherein changing the rendered polygons comprises performing one or more of a pincushion adjustment operation, a trapezoid adjustment operation, a horizontal size adjustment operation, a vertical size adjustment operation, a right pincushion adjustment operation, a left pincushion adjustment operation, a right trapezoid adjustment operation, and a left trapezoid adjustment operation.

11. The method of claim 9, wherein the handles are moveable with a mouse, a keyboard, a graphics tablet, a touch screen, or other cursor-pointing device.

12. The method of claim 9, wherein the first display comprises a computer monitor.

13. The method of claim 9, wherein the second display comprises a projection screen.

14. The method of claim 9, wherein the second display device produces a projected graphic user interface that is trapezoidal and the received locations of the handles adjust the projected graphic user interface to become rectangular.

15. The method of claim 14, wherein the received locations of the handles the projected graphic user interface to become trapezoidal.

16. The method of claim 9, wherein the graphic user interface that is stored includes a texture a computer desktop image and the vertices are located at corners of the computer desktop image.

* * * * *